Figure 1:
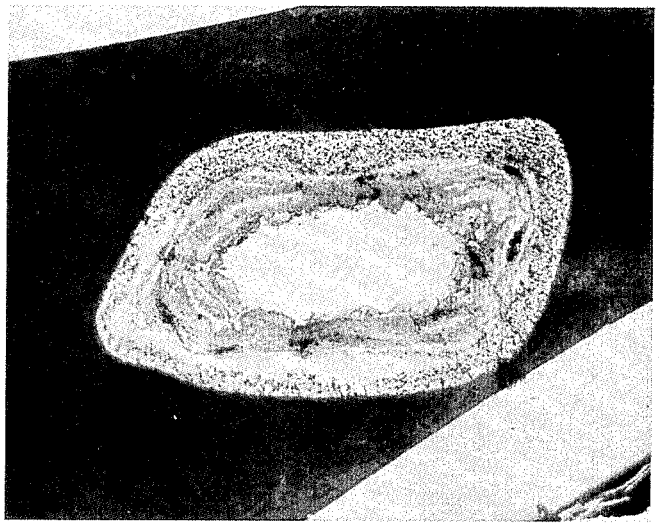

United States Patent [19]
Chart et al.

[11] 3,923,696

[45] Dec. 2, 1975

[54] CATALYST STRUCTURE

[75] Inventors: John Edward Chart, Warwick, N.Y.; Burton Bower Knapp, Allendale, N.J.

[73] Assignee: The International Nickel Company, Inc., New York, N.Y.

[22] Filed: Aug. 22, 1973

[21] Appl. No.: 390,424

[52] U.S. Cl. .............. 252/467; 252/468; 252/470; 252/472; 252/473; 252/474; 117/93
[51] Int. Cl.² . B01J 23/16; B01J 23/64; B01J 23/84
[58] Field of Search ........... 252/467, 468, 470, 472, 252/473, 474; 117/93

[56] References Cited
UNITED STATES PATENTS

| | | | |
|---|---|---|---|
| 3,226,340 | 12/1965 | Stephens et al. | 252/467 X |
| 3,362,783 | 1/1968 | Leak | 252/468 X |
| 3,669,906 | 6/1972 | Koberstein et al. | 252/470 X |
| 3,719,739 | 3/1973 | Thompson | 252/472 X |

*Primary Examiner*—Paul F. Shaver
*Attorney, Agent, or Firm*—Frank J. Mulligan, Jr.; Ewan C. MacQueen

[57] ABSTRACT

A catalyst structure particularly useful in automotive exhaust catalysis comprising a metallic substrate, a catalytic outer surface and a layer of chromium oxide interposed therebetween to inhibit reaction between exhaust gas components and the metallic base.

5 Claims, 2 Drawing Figures

3,923,696

CATALYST STRUCTURE

The present invention is concerned with a catalyst particularly designed for use in abatement of noxious materials in automobile exhaust gases and more particularly with a catalyst having a catalytically active surface and a metallic base.

It is, by now, well known that both ecological factors and governmental decree demand that the amounts of unburned hydrocarbons, carbon monoxide and nitrogen oxides (NOX) present in automotive exhaust gas streams and other combustion gas streams be reduced. One means of accomplishing this result is by heterogeneous catalysis.

Numerous types of catalysts have been suggested for accomplishing the desired results. Basically two jobs have to be done. NOX have to be reduced to elemental nitrogen and oxygen and unburned and partially burned hydrocarbons and carbon monoxide have to be oxidized to carbon dioxide and water. Many workers in the field consider that two types of catalysts must be used, one operating to promote reduction of NOX in the absence of secondary air (air introduced into the exhaust gas stream after internal combustion has taken place) and the other promoting oxidation in the presence of secondary air. While the present invention is described particularly with respect to the first kind of catalyst, it is also applicable to the second kind.

Classically in chemical technology, workers in the field have used all sorts of metal and metal oxide heterogeneous catalysts for various purposes and have supported these catalysts on various bases usually ceramic in nature. U.S. Pat. No. 3,719,739 issued to C. E. Thompson on Mar. 6, 1973, in the paragraph bridging columns 1 and 2 very clearly discloses reasons why ceramic supported catalysts are not ideally suited for automotive exhaust treatment. Such catalysts give high pressure drops. They are subject to attrition in high space velocity auto exhaust streams and they take a relatively long time to warm up to operating temperature. As a cure, with a particular ruthenium-iridium catalyst, Thompson suggested the use of a metallic support. As shown by the references cited against the Thompson patent, the concept of using metallic supports for a catalytic material dates back at least to 1933. Also as shown by the Thompson patent, once a metallic support has been selected, it is possible and practical to apply catalytic or catalytic precursor material to the support by means of electroplating techniques. While the Thompson patent is limited to use of ruthenium-iridium-containing catalytic materials, other public sources, for example, an article in Automotive Engineering July 1972 Vol. 80 No. 7, pages 50 and 51, indicate that base metal catalysts, for example an alloy of nickel with copper and possibly other metals can be coated on a metallic substrate for example in the form of "open mesh monolith" can be used with advantage in automotive exhaust systems.

The metal of the metallic support or substrate must be selected with care so as to provide a support which will provide adequate mechanical strength and will not collapse or melt in the operating temperature range of the catalyst. Further, it must be resistant to oxidation, nitridation and carburization. As examples of metals proposed heretofore for substrates reference is made to column 2 line 59 to column 3 line 15 of the aforementioned Thompson patent. There it is disclosed that workable, formable ferrous metals such as chromium steel, stainless steel and non-ferrous metals having a high enough melting point to withstand the heat of an automobile exhaust manifold (e.g., up to about 930°C and higher) and sufficient workability to be produced in the form of sheets, strip, wire screen, etc., can be used. It has been found that even these specially selected formable metals do not have adequate resistance to oxidation, nitridation and carburization in automotive gas streams and thus are likely to cause failure of the catalyst at a time prior to the desirable life of an automotive exhaust catalyst, that is ideally, the useful life of the automobile. A means for increasing the useful life of bodies comprising a metal substrate and a catalytic surface has now been discovered.

It is an object of the present invention to provide an improved novel catalyst structure.

It is another object of the present invention to provide a process for producing an improved novel catalyst structure.

Figure 2:
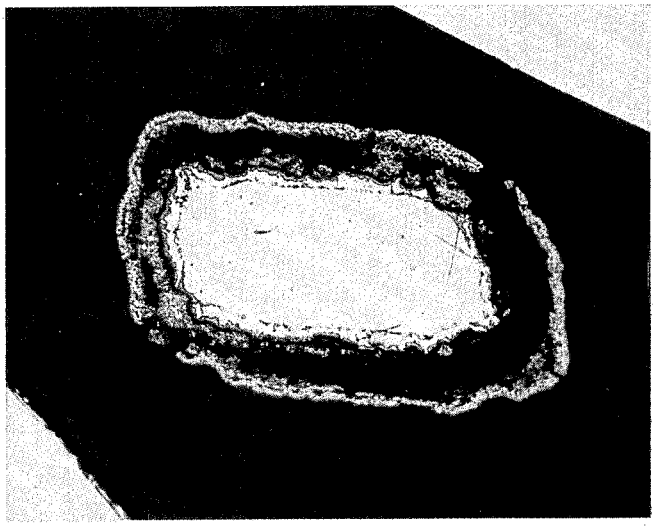

Other objects and advantages will become apparent from the following description taken in conjunction with the drawing in which FIG. 1 is a reproduction of a photomicrograph showing the cross section of a metal supported catalyst not embodying the present invention after a specific testing procedure and FIG. 2 is a similar view of a metal supported catalyst embodying the present invention after identical testing.

Generally speaking the present invention contemplates in a catalyst structure particularly adapted for use in automotive exhaust gas streams having a metallic base or substrate and a catalytically active surface supported thereby, the improvement comprising a layer of chromium oxide interposed between the substrate and the catalytically active material to inhibit reaction between the substrate with oxygen, nitrogen, NOX and carbonaceous products produced, for example, by incomplete combustion of hydrocarbon fuels.

The catalytically active material can be a metal or a metal oxide and advantageously includes a precious or non-precious metal from Group VIII of the Periodic Table (Specifically as described in the Handbook of Chemistry and Physics, 44th Edition, Chemical Rubber Publishing Company, pages 444 to 447) and alloys and mixtures thereof with one or more of copper, chromium, vanadium, zinc, molybdenum, tungsten and the like. For example, a catalytically active material for NOX reduction can be nickel-copper alloy or the oxidation product thereof.

The layer of chromium oxide is advantageously produced by oxidation of an electrodeposit of chromium at least about 4 microns thick. Good results are obtained when the chromium layer is about 5 to about 15 microns thick and envelopes every surface of the substrate exposed to the gas stream or subject to exposure to the gas stream upon spalling of the catalytic layer. In preparing the catalyst structure of the present invention, it is contemplated that an intermediate layer of essentially unalloyed chromium be deposited by electrolysis from a plating bath. The bath can be a catalysed aqueous chromic acid bath, e.g., $CrO_3$, $H_2SO_4$ and water, an aqueous tetrachromate bath, a non-aqueous chromic chloride plating bath or any other known plating bath from which chromium can be deposited under well known conditions of temperature, current density, etc. Alternatively, a chromium layer can be formed by vapor deposition using, for example, chromium carbonyl as a vaporizable source of chromium; by chromizing techniques for example using a pack of chromium particles and an ammonium chloride carrier or by slurry coating followed by compaction and sintering with or without the use of additional techniques such as electrophoretic attraction of slurry particles to the metal base. It is essential only that the chromium completely coat the substrate. Thus, for example, if a strip of nickel-chromium-iron alloy was slurry coated with chromium, the slurry coat compacted and sintered and then the strip was slit and expanded to form an expanded mesh structure, it is possible that one might wish to electroplate the formed mesh with chromium to ensure a minimum of chromium on the slit surfaces. While it is most advantageous to employ pure or essentially unalloyed chromium as a precursor of the chromium oxide layer in the improved catalyst structure of the present invention, a chromium-rich alloy layer inherently produced by chromizing techniques or deliberately by slurry coating with an alloy can be used to produced catalyst structures having advantageous characteristics.

Once the chromium layer is formed on the metal base, the catalyst can be applied. Any convenient technique can be used to apply the catalyst so long as it produces an adherent catalytic layer. Generally speaking while all of the methods applicable to the production of the chromium layer can be used to produce a catalyst layer, it is highly advantageous to produce a catalyst layer by electroplating one or more metals onto the chromium layer. When more than one metal is used the plurality of metals can be deposited simultaneously or in sequence. It is also possible to use more than one technique to deposit the more than one catalyst metal onto the chromium substrate. Usually, when more than one metal is used in the catalyst layer, and the metals are deposited in sequence, the whole of the catalyst, support, chromium layer and catalyst layer is heated in a protective atmosphere so as to interdiffuse the catalytic components. The catalytic components are then usually oxidized at least once to activate them. It is important that sufficient chromium be deposited so that after the diffusion treatment, enough chromium remains in the original site to form the chromium oxide barrier layer of the present invention. In general using nickel copper catalyst, interdiffusing the nickel and copper for eight hours at about 900°C in an inert atmosphere and oxidizing in an air-water vapor mixture at about 980°C for 3 hours a layer of chromium about 10 microns thick has been found to be satisfactory in achieving an adequate barrier of chromium oxide. Those skilled in the art will appreciate that with a milder homogenizing diffusion treatment or with a shorter time period of heating a thinner chromium layer can be used. Conversely, thicker chromium deposits can also be used with the proviso that the chromium layer must not be such as to have a crack path through the layer. At a thickness of about 10 microns, chromium layers can be electrodeposited without crack paths passing through the layer. Internal stress in thicker electrodeposits may cause difficulty in this regard.

Catalyst substrates useful in the improved catalyst structure of the present invention are generally those described hereinbefore as taught in the Thompson patent. Particular advantage has been found for use of a nickel chromium alloy containing in percent by weight about 60% nickel, 23% chromium, 1.4% aluminum, up to 1% manganese, small amounts of silicon and carbon with the balance being essentially iron apart from impurities. This alloy is readily workable and commercially available in sheet and strip form. By means of oxidizing a chromium layer at least about 3 to 5 microns thick on pellet, sheet, strip or expanded sheet or strip made of this alloy as taught by the present invention, one can provide a catalyst substrate which retains the strength and durability of the nickel-base alloy and provides it with capability to withstand the debilitating effect of automotive exhaust gases even in masses as thin as 0.05 millimeter. This capability lends itself to the preparation of catalytic structures which are highly efficient, highly useful and very long lasting.

In order to give those skilled in the art a better understanding and/or appreciation of the invention, the following examples are given.

EXAMPLE I

An expanded mesh made of an alloy known as INCONEL alloy 600 and containing about 14% to 17% by weight of chromium, at least about 72% by weight of nickel plus cobalt and about 6% to about 10% by weight of iron was coated with 0.0004 inch (10 microns) of electrodeposited chromium plus a 0.001 inch (25.4 microns) thick plated alloy catalyst coating comprising laminae of nickel and copper designed to provide about 70 percent by weight of nickel and 30 percent by weight of copper. A control specimen consists of INCONEL alloy 600 expanded metal mesh which was plated with only the 0.001 inch thick coating of the same catalyst. Both specimens were subjected to an 8 hour heat treatment at 1650°F in argon to homogenize the catalyst coating. Both specimens were then subjected to a 3 hour treatment at 1800°F in air-10%H$_2$O to activate the catalyst coating and oxidize the chromium interlayer.

Both specimens were subjected to 10 cycles of 4 hours each at 1800°F in synthetic exhaust gases. Each cycle consisted of 2 hours in an atmosphere of the composition (percentage on a wet basis) 0.15%NO, 0.01%C$_3$H$_8$, 14%CO$_2$, 0.5%H$_2$, 10%H$_2$O, 1.5%CO, 4.0%O$_2$, Bal. N$_2$, plus 2 hours in an atmosphere of the composition (percentage on a wet basis) 0.15%NO, 0.01%C$_3$H$_8$, 14%CO$_2$, 0.5%H$_2$, 10%H$_2$O, 3.0%CO, 0.5%O$_2$, Bal. N$_2$. Between each cycle the specimens were removed from the furnace, cooled, and visually examined. Samples were cut from the specimens in such a manner that the cross-section of an expanded metal strand could be examined metallographically for substrate attack caused by the test. Photomicrographs of the samples are set forth in the drawing.

The results clearly show the superior protection afforded the substrate by the oxidized 0.0004 inch thick chromium layer between the substrate and the catalyst. The system with the 0.0004 inch thick chromium layer depicted in FIG. 2 showed little if any attack on the substrate which was encapsulated by a continuous chromium oxide layer between the substrate and the catalyst coating. The other specimen depicted in FIG. 1 which had no chromium layer between the substrate and the catalyst coating showed heavy attack on the substrate and had no continuous chromium oxide layer between the substrate and the catalyst coating.

Other examples of catalyst structures in accordance with the present invention are set forth in the following Table.

TABLE

| Ex. No. | Substrate | Thickness of Chromium Layer Prior to Oxidation | Catalytic Material |
|---|---|---|---|
| 2 | INCONEL alloy 600 | 10 microns | Nickel-Copper-Chromium alloy |
| 3 | INCONEL alloy 600 | 8 microns | Copper chromite |
| 4 | Type 304 Stainless steel | 14 microns | Ruthenium and Iridium Oxides |
| 5 | Type 304 Stainless steel | 6 microns | Platinum |
| 6 | Type 304 Stainless steel | 10 microns | Iron-Manganese Oxide |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a catalyst particularly adapted for use in abatement of noxious materials in automotive exhaust, adapted to operate at high temperatures in the range of up to about 930°C. and higher in the presence of one or more of oxygen, nitrogen, nitrogen oxides and products of combustion of hydrocarbon fuel and comprising a structure having a surface catalytically active to reduce nitrogen oxides to its elements or to oxidize carbon monoxide and unburned hydrocarbons to final oxidation products and an underlying metallic base selected from the group consisting of formable, workable steel, chromium steel, stainless steel, chromium-containing nickel base alloys and other non-ferrous metals having a melting point in excess of the temperatures encountered in automotive exhaust manifolds, the improvement comprising a layer of chromium oxide interposed between said catalytically active surface and said metallic base to inhibit reaction of said metallic base with said oxygen, nitrogen, nitrogen oxides and products of combustion of said hydrocarbon fuel at said high temperatures.

2. A catalyst as in claim 1 wherein the catalytically active surface comprises a metal or one or more oxides of a metal from the group of precious and non-precious groups VIII metals, and alloys and mixtures thereof with one or more of copper, chromium, vanadium, zinc, molybdenum and tungsten.

3. A catalyst as in claim 1 wherein the chromium oxide layer is the product of oxidation of an essentially unalloyed chromium layer formed by electrodeposition.

4. A process for producing the improved catalyst of claim 1 comprising enveloping portions of said metallic base exposed to automotive exhaust with a layer essentially unalloyed chromium prior to forming the catalytically active surface thereupon and thereafter oxidizing the chromium prior to dissipation of the layer through diffusion.

5. A process as in claim 4 wherein the portions of metallic base are enveloped by electrodepositing chromium thereupon.

* * * * *